(No Model.)
K. ANUNSEN.
Harvester Dropper.
No. 243,484. Patented June 28, 1881.
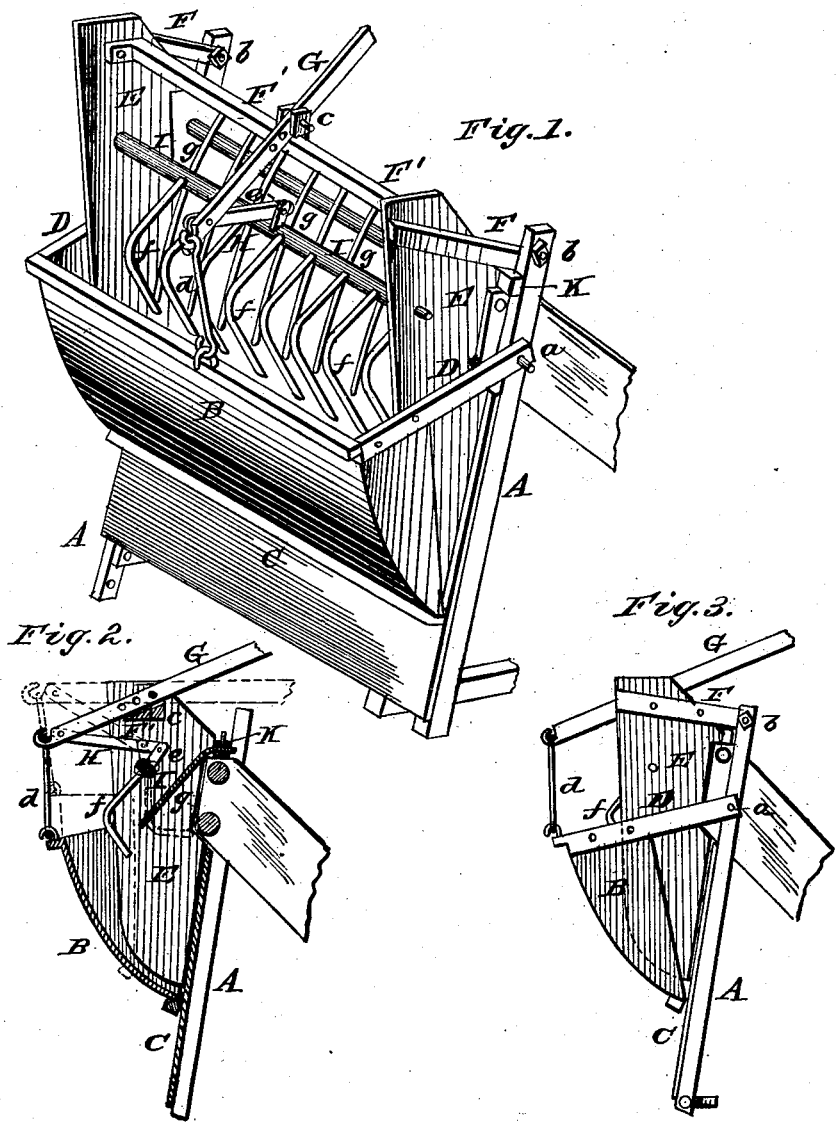
WITNESSES
Fred. G. Dieterich
P. C. Dieterich
By his Attorneys
Louis Bagger & Co.
Kittil Anunsen
INVENTOR,
N. PETERS, Photo-Lithographer, Washington, D. C.

UNITED STATES PATENT OFFICE.

KITTIL ANUNSEN, OF WINCHESTER, WISCONSIN.

HARVESTER-DROPPER.

SPECIFICATION forming part of Letters Patent No. 243,484, dated June 28, 1881.

Application filed April 5, 1881. (No model.)

*To all whom it may concern:*

Be it known that I, KITTIL ANUNSEN, of Winchester, in the county of Winnebago and State of Wisconsin, have invented certain new and useful Improvements in Harvester-Droppers; and I do hereby declare that the following is a full, clear, and exact description of the invention, which will enable other skilled in the art to which it appertains to make and use the same, reference being had to the accompanying drawings, which form a part of this specification, and in which—

Figure 1 is a perspective view of so much of a harvester-frame as is necessary to illustrate my invention. Fig. 2 is a vertical cross-section of the dropper and its appurtenances, and Fig. 3 is an end elevation.

Similar letters of reference indicate corresponding parts in all the figures.

My invention contemplates an improved construction of harvester-droppers, as hereinafter more fully described, and particularly pointed out in the claim.

In the annexed drawings, A represents the elevator-frame of a harvester of any desired construction.

B is the dropper, which is of the shape shown in the drawings, open at the top, and impinging with its lower end or bottom upon the side C of the machine. The dropper has two arms, D, one at each end, by means of which it is hinged in the upper part of the elevator-frame at $a$.

E E are two side plates or guards, having arms F, which are likewise hinged in the elevator-frame at $b$ above $a$ and extend down inside of the dropper to within a short distance of the bottom, the lower part of each being rounded to conform to the curvature of the dropper, as shown in the drawings. The plates E E are connected rigidly by a bar, F', upon the middle of which is the fulcrum $c$ for the lever G, for operating the dropper, with which said lever is connected by a rod or link, $d$, at its outer end.

H is an arm which extends from the outer end of lever G, to which it is pivoted, to a bracket or projection, $e$, upon a rod, I, the ends of which are pivoted in the side plates, E. This pivoted rod I has a series of curved fingers, $f$, so spaced or placed as to alternate with a series of fingers, $g$, which are secured in a bar, K, reaching from end to end of the elevator, and forming the upper part thereof, over which the grain is discharged down into the dropper.

When the dropper B, actuated by its own gravity, is in its closed position, the finger-bar I, actuated by the arm H, will be in the position shown in full line in the drawings, with an open space between its curved fingers and the rigid discharge-fingers $g$, to permit of the passage of the cut grain from the elevator down into the dropper; but when the dropper is opened by depressing the inner end of lever G, as shown in dotted lines, arm H will operate to so tilt bar I as to project the ends of its curved fingers into the spaces between the stationary fingers $g$, with which they alternate, thus closing the grain-passage during the period the dropper is held open to discharge the gavel. The hinged plates or guards E prevent the escape of the cut grain, as it is received in the hopper, sidewise, besides forming means of attachment and bearings for the bars F and I, respectively. They are held in their proper position within the dropper by their own gravity, and by lifting them out from the frame of the machine, against which they impinge, this can readily be cleaned, when desired, without detaching any part or portion of the dropper.

Having thus described my invention, I claim and desire to secure by Letters Patent of the United States—

The combination, in a harvester-dropper, of the dropper B, having arms D hinged to the elevator at $a$, guard-plates E, having arms F hinged to the elevator at $b$, and connected by the fulcrum-bar F', and pivoted bar or rock-shaft I, having curved fingers $f$, rigid bar K, having discharge-fingers $g$, lever G, arm H, and connecting rod or link $d$, all constructed and combined to operate substantially in the manner and for the purpose shown and set forth.

In testimony that I claim the foregoing as my own I have hereto affixed my signature in presence of two witnesses.

KITTIL ANUNSEN.

Witnesses:
AUGUST PETERSON,
JNO. A. MADIGAN.